Feb. 18, 1964   W. J. HALL   3,121,368
SLIDE PROJECTOR
Filed March 16, 1961   5 Sheets-Sheet 1

Inventor:
Walter J. Hall
By Robert F. Miehle, Atty.

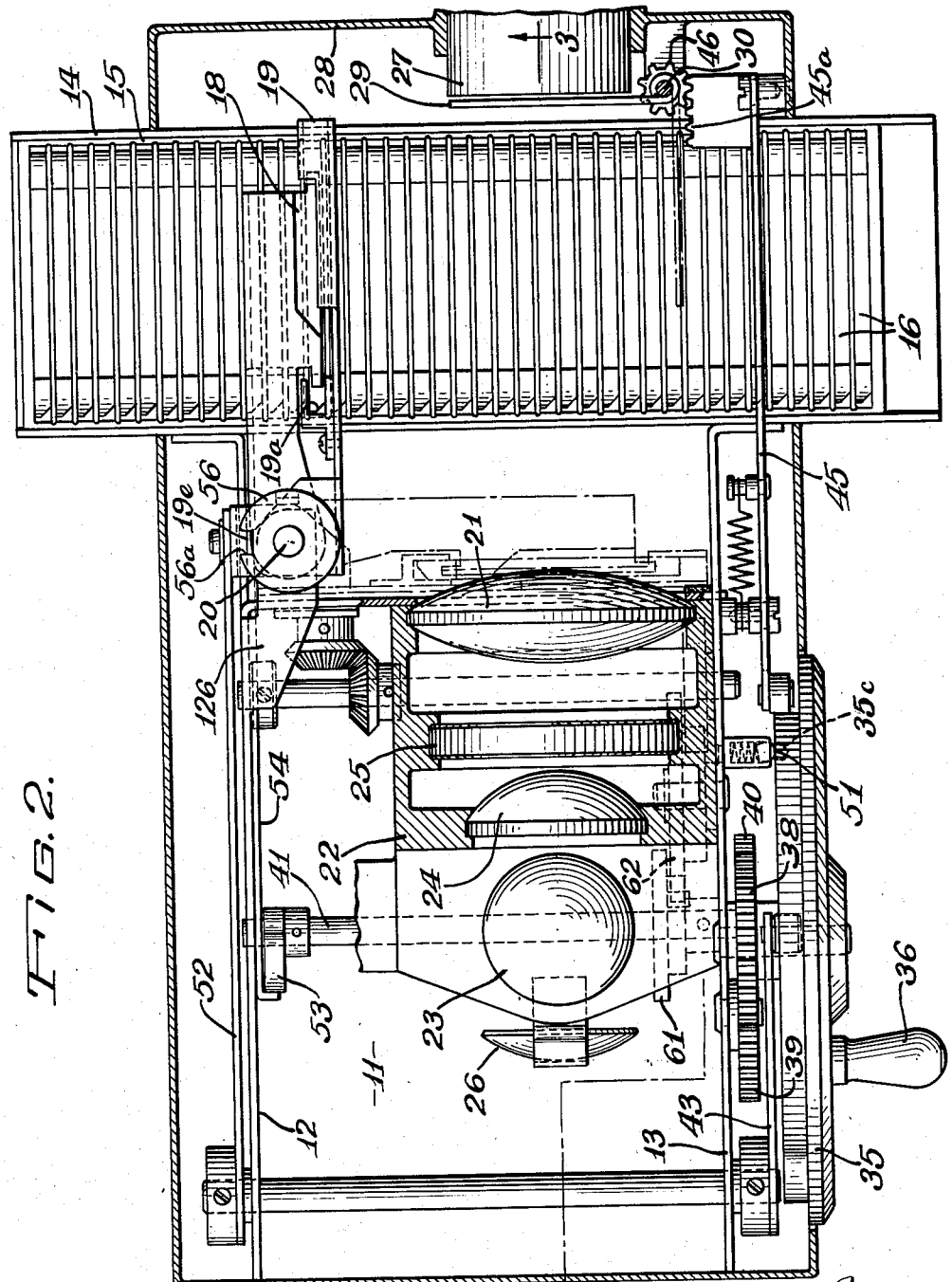

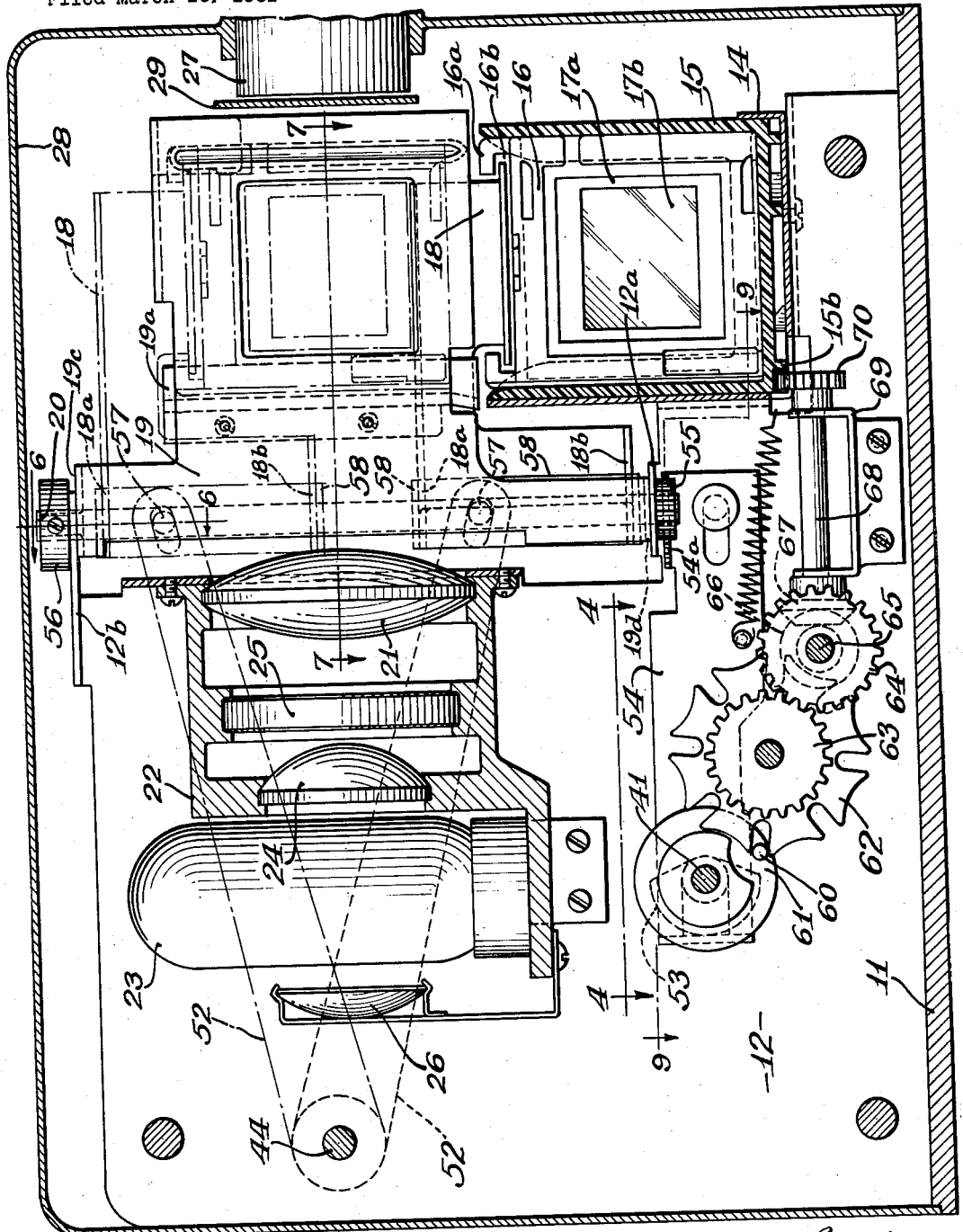

Feb. 18, 1964 W. J. HALL 3,121,368
SLIDE PROJECTOR
Filed March 16, 1961 5 Sheets-Sheet 4
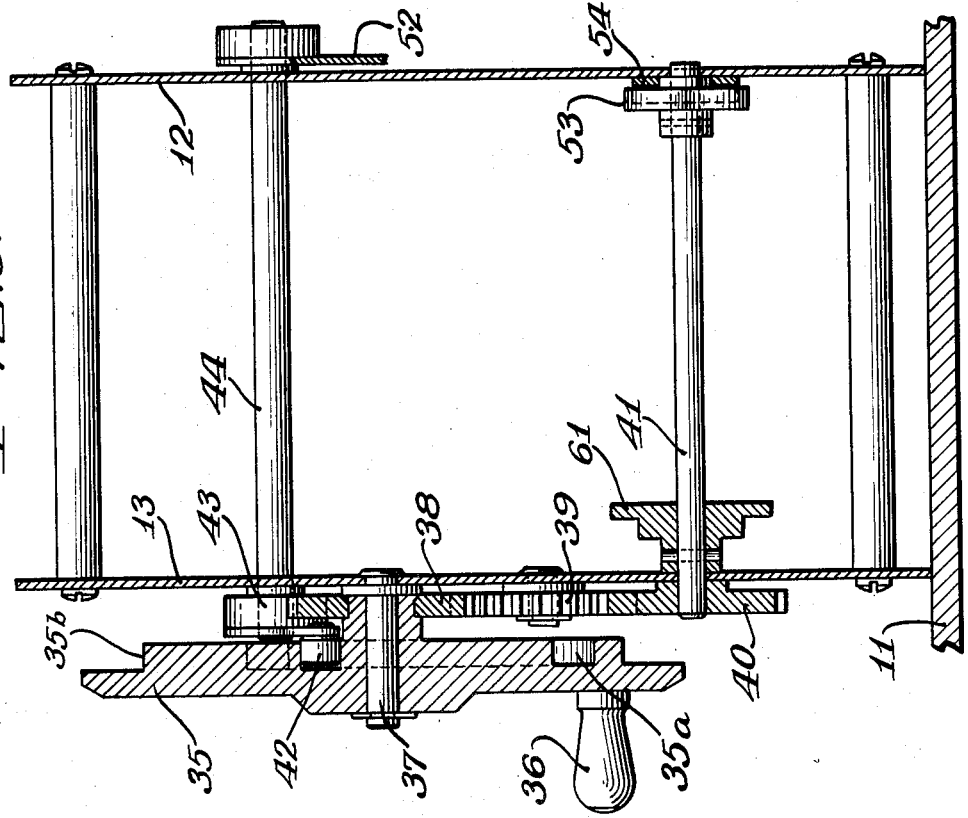
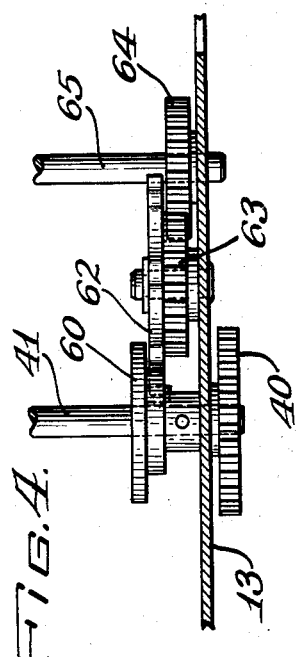
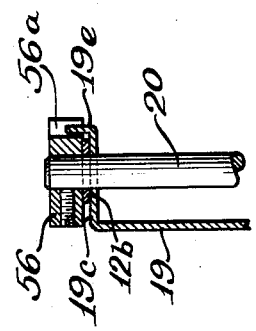
Inventor:
Walter J. Hall
By Robert F. Miehle, Atty.

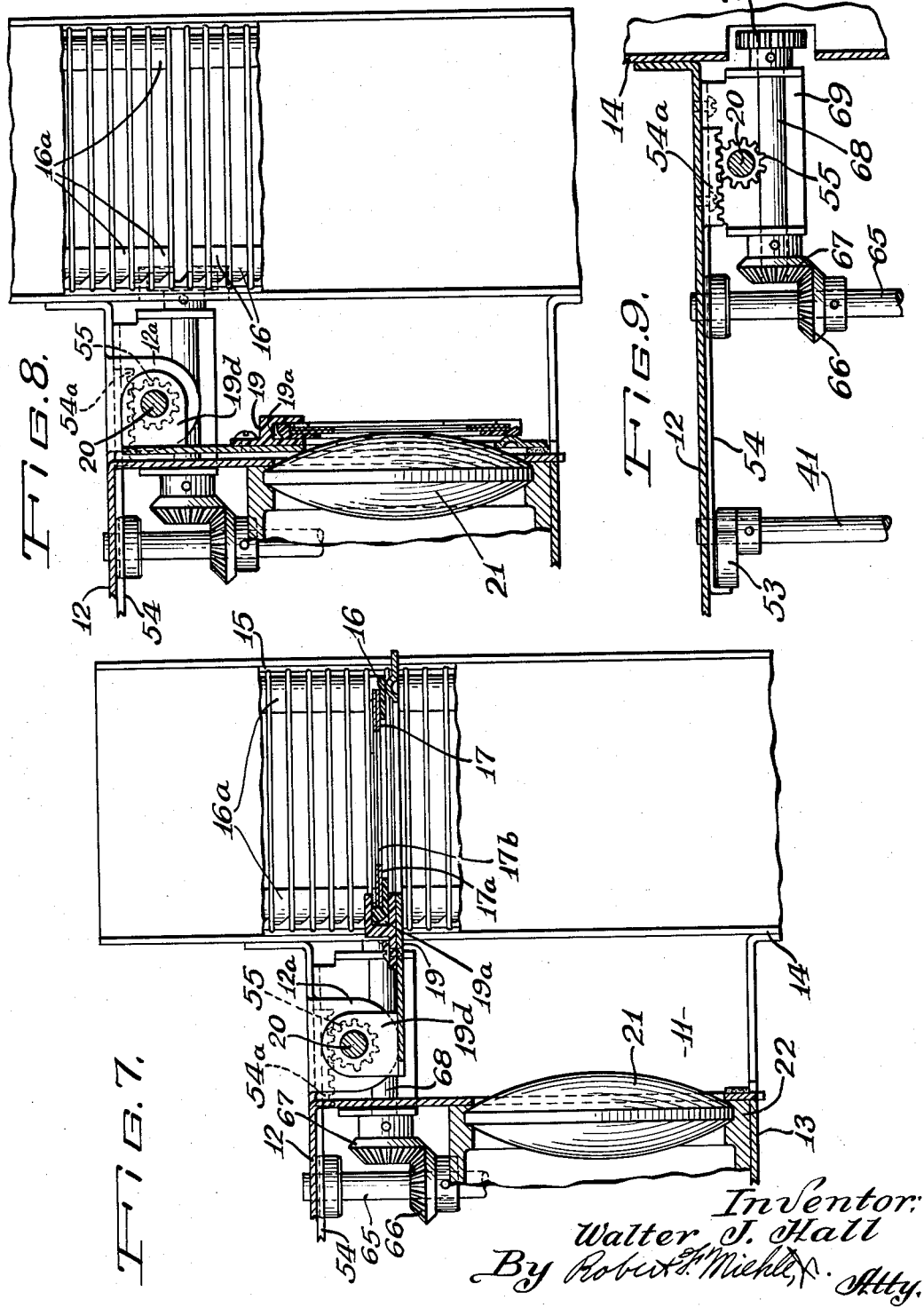

United States Patent Office 3,121,368
Patented Feb. 18, 1964

3,121,368
SLIDE PROJECTOR
Walter J. Hall, Chicago, Ill., assignor to Bell & Howell
Company, Chicago, Ill., a corporation of Illinois
Filed Mar. 16, 1961, Ser. No. 96,288
10 Claims. (Cl. 88—28)

This invention relates to a slide projector, and more particularly to an improved slide projector of the magazine type.

An object of the invention is to provide a new and improved magazine type slide projector.

Another object of the invention is to provide a slide projector which a slide is raised out of a tray, swung into contact with a condenser lens, projected, swung back and lowered into the tray.

Other objects of the invention will be apparent from the following detailed description of a slide projector forming a specific embodiment thereof, when read in conjunction with the appended drawings, in which:

FIG. 2 is a horizontal sectional view of the projector of FIG. 1;

FIG. 3 is a vertical sectional view taken along line 3—3 of FIG. 2;

FIG. 4 is a horizontal sectional view taken along line 4—4 of FIG. 3;

FIG. 5 is a vertical sectional view taken along line 5—5 of FIG. 1;

FIG. 6 is a vertical sectional view taken along line 6—6 of FIG. 3;

FIG. 7 is a horizontal sectional view taken along line 7—7 of FIG. 3;

FIG. 8 is a view similar to FIG. 7 but with parts thereof in different positions; and FIG. 9 is a horizontal sectional view taken along line 9—9 of FIG. 3.

Figure 1:
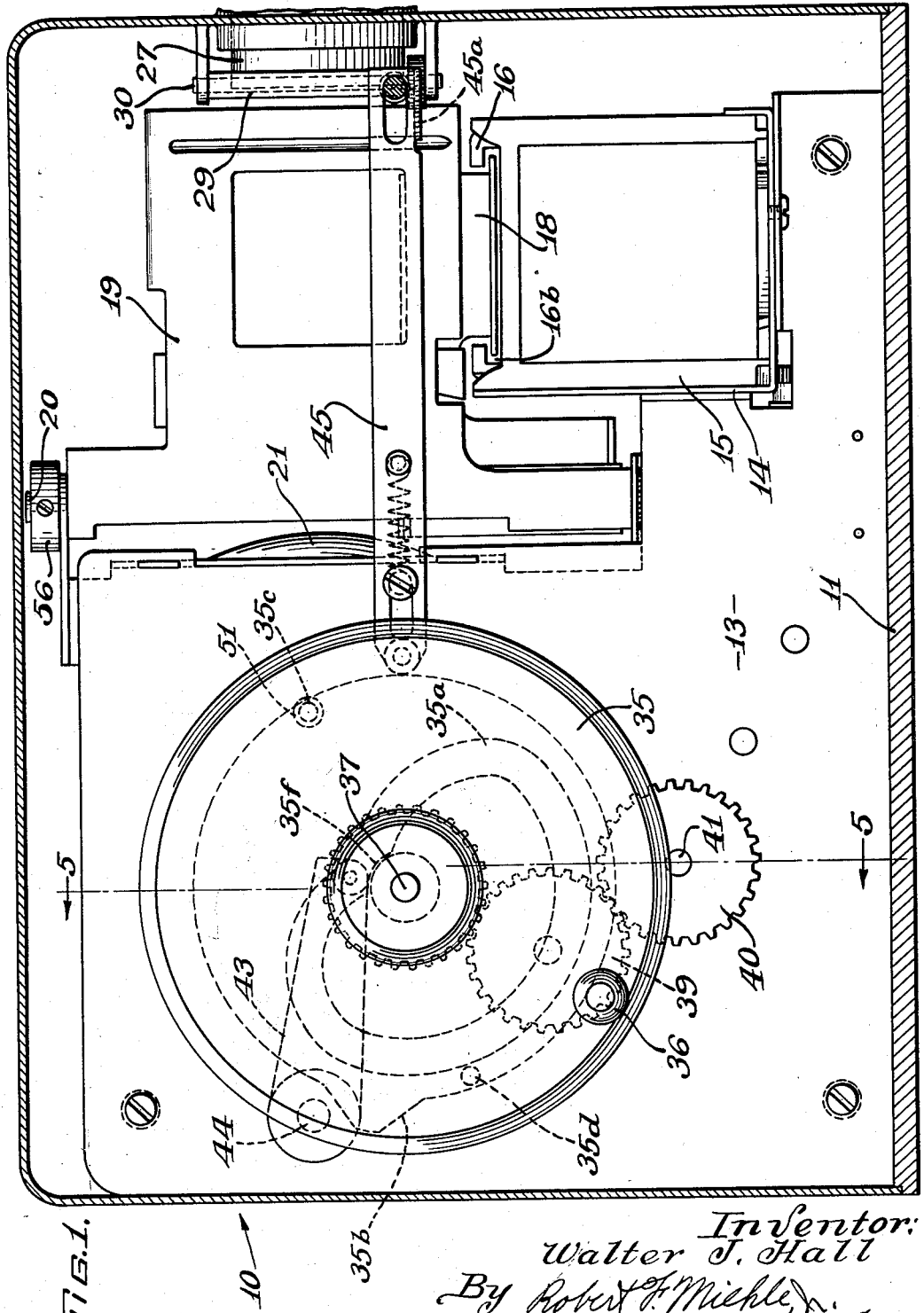
FIG. 1 is a vertical sectional view of a slide projector forming a preferred embodiment of the invention.

The invention provides a slide projector having a guide extending cross-wise of the projector below the optical axis together with a guide frame into which a slide holder is pulled from the tray after which the frame is swung to a position holding a transparency against a convex condenser lens to prevent popping of the transparency. After projection, the guide frame is swung back over the tray, the slide holder is lowered into the tray and the tray is indexed to present another slide holder into position to be moved to the projection position. The guide frame is mounted pivotally for movement between its projection position holding the transparency at the projection position and a slide loading position in which a puller slidable in the frame is aligned with a slide holder in the tray.

Referring now in detail to the drawings, there is shown therein a slide projector 10 having a base 11 together with parallel vertical mechanism plates 12 and 13 and an upwardly facing, channel-like tray guide 14 for guiding a tray 15 crosswise of the projector. The tray 15 is of a known type and supports frame-like slide holders 16 (FIGS. 7 and 8) carrying standard slide mounts 17 having cardboard frames 17a and slide transparencies 17b. The slide holders 16 have hooks 16a forming T-shaped slots 16b (FIG. 1) with the upper ends of the channel-like frame portions of the slide holders, and a T-shaped puller 18 is adapted to pull the holders one at a time from septums of the tray and reinsert the removed holder into the tray. The puller 18 is slidable in a vertical guideway 19a of a carriage or guide 19. The T-shaped puller is adapted to pull the slide holder into the guideway 19a, and then the carriage 19 is swung from the loading position thereof shown in FIG. 7 to the projection position thereof shown in FIG. 8, the carriage being fixed and keyed to a vertical shaft 20 and oscillatable with the shaft. When the carriage is in its projection position, the transparency is urged against condenser lens 21 so that the transparency will not pop away from the condenser. The condenser is supported by a mounting frame 22 supported by plates 12 and 13. The frame 22 also supports condenser lamp 23 (FIGS. 2 and 3), lenses 24 and 25 and reflector 26. A projection lens 27 is carried by housing 28 and a shutter 29 is mounted pivotally by shaft 30 for shutting off light from the lens 27.

The drive for the projector includes a cam or crank disc 35 (FIGS. 1, 2 and 5) having a handle 36 and rotatable on post 37 secured to plate 13. The cam disc 35 has a cam slot 35a and a gear 38 is keyed to the disc 35 and meshes with idler gear 39 to drive gear 40 keyed to shaft 41. Cam follower roll 42 carried on arm 43 keyed to shaft 44 travels in the cam groove 35a. When a user turns the disc 35, the disc by a cam 35b actuates a cam follower 45 to swing shutter 29 open after the transparency is in its projection position and swing the shutter closed before moving the transparency from the projection position. The follower 45 has a rack portion 45a meshing with pinion 46 keyed to the shaft 30.

The crank disc 35 is resiliently detented in two positions, the first being the start position in which a spring pressed detenting ball 51 (FIG. 2) enters detent hole 35c and the second being the projection position in which the ball 51 enters detent hole 35d (FIG. 1). Assuming the projector to be in the start position, about 180° of rotation of the disc 35 rotates the shaft 41 continuously and turns the shaft 44 to swing lever 52 from its lower position shown in FIG. 3 to the uppermost position shown in FIG. 3 to raise the puller 18 and a slide holder 16 into the carriage 19 and out of the tray 15. Then a cam 53 keyed to shaft 41 permits spring pressed cam follower 54 to move to the right, as viewed in FIGS. 2 and 3, to drive pinion 55 by a rack 54a to turn shaft 20 to which the pinion 55 is keyed. The shaft 20 turns the carriage 19 clockwise to move the transparency against the condenser lens 21 as illustrated in FIG. 8, which is the projection position. At this time, the detent hole 35d (FIG. 1) receives the detent ball 51 to apprise the user that the projection position is reached and the user then stops cranking the disc 35 for the desired projection. The shaft 20 is mounted on brackets 12a and 12b (FIGS. 1 and 7) and thrust collar 56. As shown in FIG. 3, the puller 18 has perforated ears 18a and 18b slidable and rotatable on the shaft 20, and the raising and lowering lever arm 52 is connected to the puller 18 by a pin-and-slot connection 57 and a bracket 58 slidable on the shaft 20 and bracketing the ears 18a and 18b. The carriage 19 has perforated ears 19c and 19d through which the shaft 20 extends and a tab 19e (FIG. 6) fits into a notch 56a to key the carriage to the collar 56 and shaft 20.

After the slide 17 has been projected for the desired time, the operator turns the crank disc 35 from the projection detented position to the start detented position. In so moving, the crank disc moves shutter 29 to its closed position, turns the carriage 19 back across the tray 19, and then through the lever 52 and follower 43 lowers the puller 18 from its broken line position of FIG. 3 to its full line position to push the slide holder 16 out of the guideway 19a of the carriage 19 and fully into its septum in the tray 15 so that the tray may be indexed to present the next slide holder 16 into alignment with the puller 18. The disc 35 then causes a pin 60 of Geneva drive crank 61 to turn a Geneva drive wheel 62 one-eighth of a revolution to also turn gear 63 keyed to wheel 62 and turn gear 64 keyed to shaft 65.

The shaft 65 indexes the tray 16 through bevel gears 66 and 67 (FIGS. 3 and 9), shaft 68 mounted in fixed bracket 69, and indexing gear or pinion 70 meshing with a rack 15b of the tray 15. The crank disc 35 then comes to its start detent position. While the tray is being indexed, a dwell portion 35f (FIG. 1) of the cam slot 35a causes the puller 18 to be stationary.

While the invention is thus described, it is not wished to be limited to the precise details described, as changes may be readily made without departing from the spirit of the invention.

What is claimed is:

1. In a slide projector for a tray open at the top and carrying a plurality of slide holders having hooks at the upper ends thereof, a tray guideway for the tray, an optical system positioned at a level above the top of the tray and having an axis extending transversely of the guideway, a carriage having a slide holder guideway, a puller, and means for raising and lowering the puller to raise and lower a slide holder into and out of the slide holder guideway in the carriage, means mounting the carriage for pivotal movement between a projection position extending transversely of the optical axis and a normal position extending transversely of the tray and in alinement with a slide holder in said tray and means for pivoting said carriage.

2. The projector of claim 1 and including means splining the puller to the carriage.

3. The projector of claim 1 wherein the puller is provided with guide means mounting the puller slidably in the slide holder guideway.

4. The projector of claim 1 in which the optical system includes a condenser lens having a convex forward surface positioned so as to be engaged by a transparency carried by a slide holder in the carriage when the carriage is in its position extending transversely of the optical axis.

5. The projector of claim 1 and including Geneva drive means for indexing the tray along the tray guideway.

6. In a projector adapted to use a tray open at the top and carrying a plurality of slide holders having opposed hooks at the tops thereof, a horizontal tray guideway, a condenser lens convex at the forward surface thereof and positioned above the level of the top of the tray and at one side of the tray and facing the tray, a vertical shaft, a carriage having a slide holder guideway fixed to the shaft, means for oscillating the shaft between a position in which the carriage extends over the tray and transverse to the tray with the slide holder guideway aligned with a slide holder in the tray and a position pressing a transparency in the slide holder against the condenser lens, a puller splined to the shaft and carriage for pulling the slide holder into the guideway and out of the tray and holding the slide holder above the tray as the carriage is oscillated, the puller also serving to push the slide holder back into the tray, timed means for raising and lowering the puller, and means for indexing the tray in timed relationship to the movements of the carriage and puller.

7. In a slide projector for a tray open at the top and carrying a plurality of slides, a tray guideway for the tray, an optical system positioned at a level above the top of the tray and having an axis extending across the guideway, a carriage having a slide guideway, a slide-moving means, means for raising and lowering the slide-moving means to raise and lower a slide into and out of the slide guideway in the carriage, means mounting the carriage for pivotal movement and means for pivoting said carriage between a projection position extending across the optical axis and a normal position extending across the tray.

8. The projector of claim 7 and including means splining the slide-moving means to the carriage.

9. The projector of claim 7 wherein the slide-moving means is provided with guide means mounting the slide-moving means slidably in the slide guideway.

10. In a slide projector adapted for use with a tray open at one side thereof and carrying a plurality of slides in septums, a guideway for said tray, an optical system spaced from said guideway and having its optical axis arranged transversely of said guideway, means for removing a slide from the tray and placing it in a slide guide in a carrier member, means mounting the carrier member for pivotal movement between a position in alinement with a slide septum in said tray and a position wherein it extends transversely of said optical axis, means for pivoting said carrier member with a slide held in said slide guide from its position in alinement with the slide septum for said slide in the tray to its position transversely of said optical axis and back to its position in alinement with the slide septum, means for returning said slide to said septum, and means for indexing the tray in timed relationship to the movement of the carrier member and the means for removing a slide from and returning it to a septum.

References Cited in the file of this patent
UNITED STATES PATENTS
2,984,151   Halahan et al. _____ May 16, 1961